US011258700B1

(12) United States Patent
Bajaj et al.

(10) Patent No.: US 11,258,700 B1
(45) Date of Patent: Feb. 22, 2022

(54) ENHANCED MESSAGING FOR BACKUP STATE STATUS NOTIFICATIONS IN COMMUNICATIONS NETWORKS

(71) Applicant: Versa Networks, Inc., San Jose, CA (US)

(72) Inventors: Kapil Bajaj, Fremont, CA (US); Indira Priyadarshini Thangella, San Jose, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 17/218,047

(22) Filed: Mar. 30, 2021

(51) Int. Cl.
*H04L 12/703* (2013.01)
*H04L 12/707* (2013.01)
*H04L 12/24* (2006.01)
*H04L 12/713* (2013.01)
*H04L 45/28* (2022.01)
*H04L 45/00* (2022.01)
*H04L 41/085* (2022.01)
*H04L 41/0668* (2022.01)
*H04L 45/586* (2022.01)

(52) U.S. Cl.
CPC .......... *H04L 45/28* (2013.01); *H04L 41/0668* (2013.01); *H04L 41/0856* (2013.01); *H04L 41/0863* (2013.01); *H04L 45/22* (2013.01); *H04L 45/586* (2013.01)

(58) Field of Classification Search
CPC ............. H04L 41/0668; H04L 41/0856; H04L 41/0863; H04L 45/11; H04L 45/28; H04L 45/586
See application file for complete search history.

(56) References Cited

U.S. PATENT DOCUMENTS

| 9,100,274 | B1* | 8/2015 | Ghosh | H04L 49/70 |
| 9,521,070 | B2* | 12/2016 | Sato | H04L 45/586 |
| 2005/0265230 | A1* | 12/2005 | Na | H04L 45/00 370/219 |
| 2007/0230472 | A1* | 10/2007 | Jesuraj | H04L 45/28 370/392 |
| 2017/0005915 | A1* | 1/2017 | Mirsky | H04L 69/40 |

FOREIGN PATENT DOCUMENTS

| EP | 1006702 A2 * | 6/2000 | .......... H04L 49/552 |
| JP | 2014033384 A * | 2/2014 | |

OTHER PUBLICATIONS

D. Katz et al. "Request for Comments (RFC) 5883: Bidirectional Forwarding Detection (BFD) for Multihop Paths", Jun. 2010, 6 pages. (Year: 2010).*

(Continued)

*Primary Examiner* — George C Neurauter, Jr.
(74) *Attorney, Agent, or Firm* — Loza & Loza, LLP (57) ABSTRACT

Enhanced messaging is described to support status notifications regarding backup nodes of a data communications network. In one example, a status of a network node at the network node is monitored. The network node is coupled to a network. It is determined that the node is operating in a backup state, and a backup alive packet is sent through the network in response to determining that the node is operating in a backup state.

19 Claims, 10 Drawing Sheets

(56) References Cited

OTHER PUBLICATIONS

D. Katz et al. "Request for Comments (RFC) 5880: Bidirectional Forwarding Detection (BFD)", Jun. 2010, 49 pages. (Year: 2010).*
S. Nadas. "Request for Comments (RFC) 5798: Virtual Router Redundancy Protocol (VRRP) Version 3 for IPv4 and IPv6", Mar. 2010, 40 pages. (Year: 2010).*
Gupta, N. et al. "Fast failure detection in VRRP with Point to Point BFD", Network Working Group, Internet Draft, draft-nitish-vrrp-bfd-p2p-02, Jan. 24, 2018, 27 pgs.

* cited by examiner

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    IPv4 Fields Or IPv6 Fields                 |
+-+-+-+-+-+-+-+-+-+-+-+-+-+-+-+-+-+-+-+-+-+-+-+-+-+-+-+-+-+-+-+-+
|Version|  Type |  Virtual Rtr ID  |   Priority   | Count IPvX Addr|
+-+-+-+-+-+-+-+-+-+-+-+-+-+-+-+-+-+-+-+-+-+-+-+-+-+-+-+-+-+-+-+-+
|(rsvd)|   Max Adver Int   |          Checksum                  |
+-+-+-+-+-+-+-+-+-+-+-+-+-+-+-+-+-+-+-+-+-+-+-+-+-+-+-+-+-+-+-+-+
|                                                               |
+                                                               +
|                         IPvX Address (es)                     |
+                                                               +
|                                                               |
+-+-+-+-+-+-+-+-+-+-+-+-+-+-+-+-+-+-+-+-+-+-+-+-+-+-+-+-+-+-+-+-+
```

ENHANCED MESSAGING FOR BACKUP STATE STATUS NOTIFICATIONS IN COMMUNICATIONS NETWORKS

TECHNICAL FIELD

The embodiments herein relate to data communications through wired networks and to messages to support status notifications regarding backup nodes of the network.

BACKGROUND

Network data communications have moved beyond asynchronous text and file transfer traffic to time-sensitive traffic such as streaming and interactive communications. At the same time many of the resources being used to carry the data are virtualized. A VNF (Virtual Network Function) may take the place of a hardware router. A VRRP (Virtual Router Redundancy Protocol) is used to assign routes through virtual routers denoting some virtual routers as masters and others as backups.

Router redundancy techniques are intended to provide uninterrupted internet data communications service in the event of various failures. VRRP attempts to compensate for the design of the Internet to provide reliability similar to that provided by telephony service at the lower cost of the Internet. In VRRP, a master node of a local area network (LAN) or other suitable network is backed up by a backup node that is coupled to the same network in order to provide a seamless switchover to the backup node in the event of a failure at the master node. A centralized management system monitors the master and backup nodes to ensure that there is a backup for each master. When either the master or backup node fails or loses connectivity, then an alarm is sent to the centralized management system to indicate that there is no longer any backup available.

SUMMARY

Enhanced messaging is described to support status notifications regarding backup nodes of a data communications network. In one example, a status of a network node is monitored at the network node. It is determined that the node is operating in a backup state, and a backup alive packet is sent through the network in response to determining that the node is operating in a backup state.

In some embodiments the backup state is a VRRP (Virtual Router Redundancy Protocol) backup state and wherein sending the backup alive packet comprises sending a backup alive message in a VRRP packet format. In some embodiments, the backup alive message is contained in a Type field of the VRRP packet format. In some embodiments, determining that the node is operating in the backup state comprises determining that the node is transitioning to a VRRP backup state from a different state. In some embodiments, sending a backup alive packet comprises sending multiple consecutive backup alive packets.

Some embodiments include monitoring VRRP advertisement packets of other network nodes of the network, transitioning to a VRRP master state if no master VRRP advertisement packet is received having a higher router priority than the network node, and ceasing sending the backup alive packet.

Some embodiments include monitoring VRRP advertisement packets of other network nodes of the network, transitioning to a VRRP backup state when a master VRRP advertisement packet is received having a higher router priority than the network node, and sending the backup alive packet.

Some embodiments include sending a VRRP advertisement packet after transitioning to a VRRP master state. Some embodiments include monitoring VRRP backup alive packets of other nodes of the network, and ceasing sending the backup alive packet upon receiving a VRRP backup alive packet having a higher router priority than the network node.

In another example, a network node includes a system monitor configured to monitor a status of the network node and to determine that the network node is operating in a VRRP (Virtual Router Redundancy Protocol) backup state, and a VRRP (Virtual Router Redundancy Protocol) module configured to send a backup alive packet in a VRRP packet format through the network in response to determining that the network node is operating in a backup state.

In some embodiments the VRRP module is further configured to monitor VRRP advertisement packets of other network nodes of the network, determine a relative router priority of the network node, and send the backup alive packet where there is no other backup network node having a higher router priority than the network node.

In some embodiments, the VRRP module is configured to monitor VRRP advertisement packets of other network nodes of the network, transition to a VRRP master state if no master VRRP advertisement packet is received having a higher router priority than the network node, and cease sending the backup alive packet.

In another example, a method includes monitoring backup alive packets of other network nodes at a first network node of a network, wherein the first network node is operating in a master state, and sending a backup not available set alarm message from the first network node to a management system for the network in response to not receiving a backup alive packet.

Further embodiments include receiving a backup alive packet at the first network node from a second network node through the network, and sending a backup not available clear alarm message to the management system in response to receiving the backup alive packet. Further embodiments include monitoring advertisement packets of other network nodes at the first network node of a network before the operation of operating in the master state, wherein the first network node is operating in a backup state, and transitioning from the backup state to a master state in response to not receiving a higher router priority VRRP master advertisement packet before the operation of monitoring backup alive packets of other network nodes.

Further embodiments include receiving a VRRP master advertisement packet from a third network node having a higher router priority than the first network node, transitioning at the first network node from the master state to the backup state in response to receiving the higher router priority VRRP master advertisement packet, and sending a backup not available clear alarm message to the management system in response to transitioning to the backup state.

In further embodiments, the backup state is a VRRP (Virtual Router Redundancy Protocol) backup state and wherein receiving the backup alive packet comprises receiving the backup alive packet in a VRRP packet format. In further embodiments, the backup alive packet contains backup alive information in a Type field of the VRRP packet format.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein are described in the context of a Software Defined Wide Area Network (SD-WAN or SDWAN) where there is at least one designated hub node for each of the branch nodes and each hub node potentially acting as a gateway to a plurality of branch nodes. Further, branch nodes themselves may have direct access to the Internet through one or more WAN links. However, embodiments disclosed herein can be applied in non-software-defined WANs and for applications hosted within the network, e.g., within a LAN (Local Area Network).

The embodiments herein are described in the context of VRRP which provides a protocol by which a network node or router transitions into different states based on a priority that is provisioned to each router. The state transitions are aided by packets that are sent by each node or router to send its state and priority to other routers. The structure and operations described herein may be applied to any other type of network and protocol which includes the particular characteristics as described in any respective claim herein. VRRP is designed for Internet Protocols IPv4 and IPv6 and may be applied to networks that have wired or wireless links or a combination of both wired and wireless links between routers. The embodiments described herein are suitable for networks with wired or wireless data communication paths or a combination of both.

Figure 1:
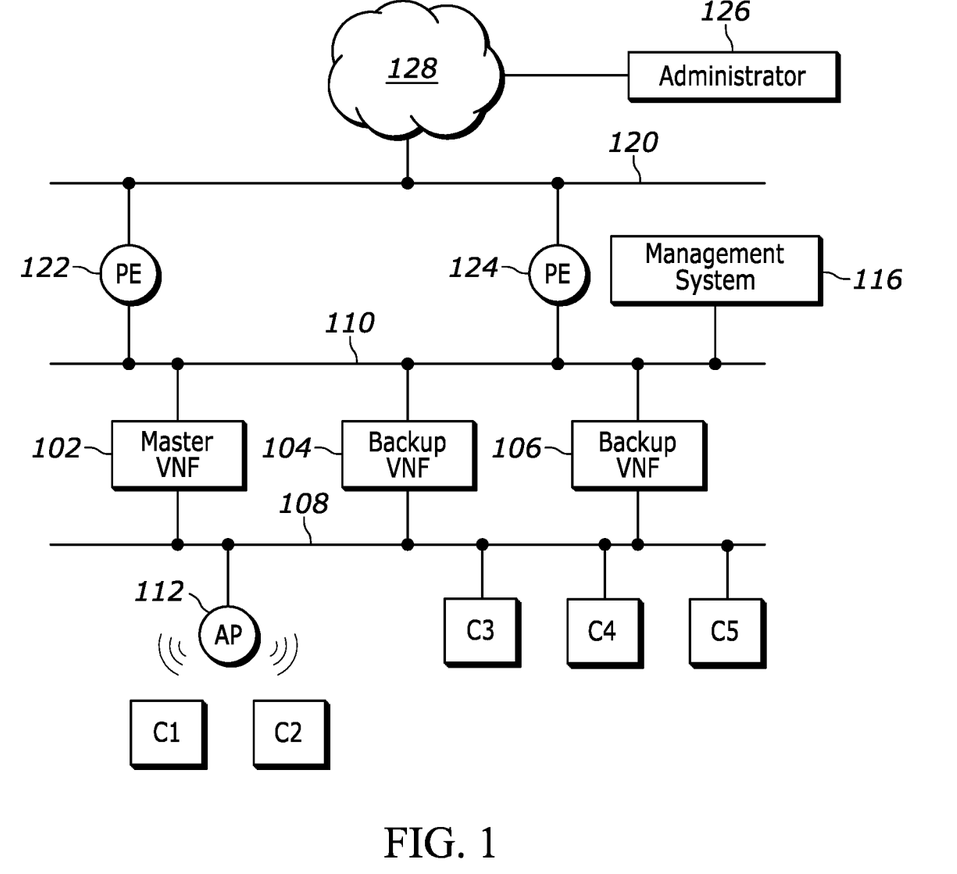
FIG. 1 is a block diagram of a network suitable for use with the present invention.

FIG. 1 is a simplified diagram of a wired or wireless network in which multiple nodes, for example routers, have redundant paths between multiple clients and the cloud or the Internet. As used herein network communication devices are referred to as nodes. A node may be a router or it may be another device that receives data traffic and sends the data traffic to another node. As such, "nodes" are intended to include "routers" and also a variety of other physical or virtual devices to which the techniques and structures herein may apply. A first node 102 is an active VNF operating in a master state that is coupled to a second node 104 and a third node 106 that are operating in backup states through a network link 110. The first, second, and third nodes 102, 104, 106 may be physical nodes or virtualized resources and are coupled together through a local area network 108 that may employ VRRP operation in which the first, second, and third nodes 102, 104, 106 have relative node priorities that cause a status relationship.

In this example, the first node 102 is a VRRP master router with the highest relative router priority e.g., 200, the second 104 is a VRRP backup router with an intermediate relative router priority e.g., 150, and the third node 106 is a VRRP backup router with the lowest relative router priority e.g., 100. The backup routers may operate in a different state when communicating with other routers. The first, second, and third nodes 102, 104, 106 are coupled to a wireless AP (Access Point) 112 and directly to clients C3, C4, C5 through the local area network 108 using any suitable protocol. The AP 112 may be coupled to a wired or wireless client network that includes additional clients C1, C2. While only one AP is shown in this example, any one or more of the connections may be rendered over Wi-Fi or another wireless connection technology.

On the northbound side and opposite from the clients on the southbound side of the diagram, the first, second, and third nodes 102, 104, 106 are coupled to a first PE (Provider Edge) 122, a second PE 124, and a centralized management system 116 for the network. The first and second PEs 122, 124 are coupled through a WAN (Wide Area Network) 120 to further external resources, for example the Internet 128. An administrator 126 for the system is coupled through the Internet 128 or more directly to a network link 120, 110, 108 of the network. The first and second PEs 122, 124 are both connected to each of the first, second, and third nodes 102, 104, 106 so that if any one fails, then another one can make all of the same connections. The same is true of the first and the second PEs 122, 124. In addition, if there is a failure in any of the links used by one of the nodes then there is likely to be an alternative link coupled to the other one of the nodes that can be used as an alternative. While the first, second, and third nodes 102, 104, 106 are indicated as being configured as VNFs, alternative configurations may be used to suit different implementations.

VRRP (Virtual Router Redundancy Protocol) provides a way to notify all other nodes of the existence of a router operating in a master state by using advertisement packets sent by the master router. The advertisement packets are sent at regular intervals and include an identification of the router, the relative router priority and other useful information. These and other packets are monitored by other routers on the network. With VRRP, the routers may be physical routers or VNFs (Virtual Network Functions).

Figure 2:
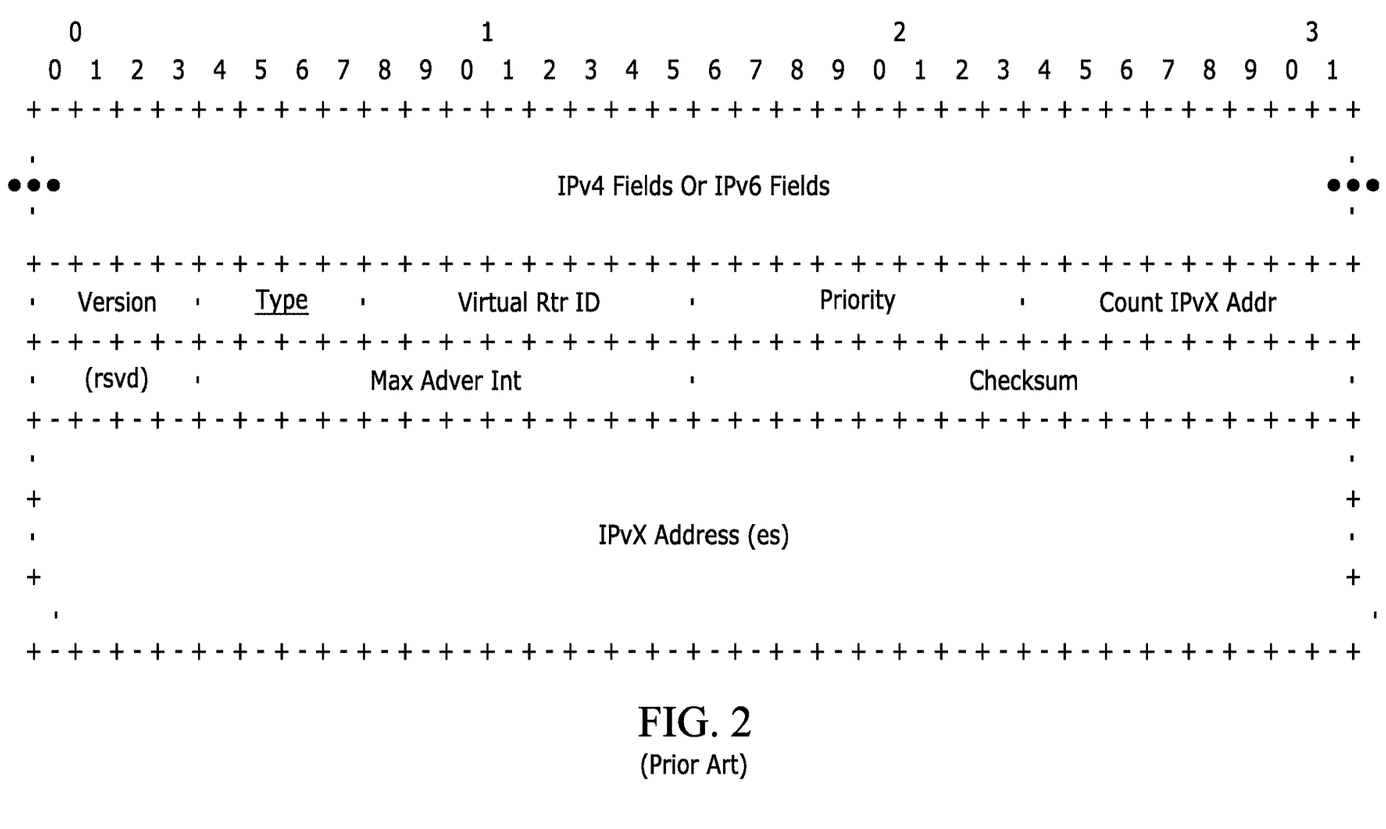
FIG. 2 is a diagram of VRRP packet format suitable for carrying messages with different Type fields as described herein according to embodiments of the present invention.

FIG. 2 is a diagram of a VRRP Packet Format suitable for sending a master router advertisement packet in accordance with VRRP Version 3 for IPv4 and IPv6 as provided in RFC 5798 (Request for Comment), Section 5.2.2. The packet includes a portion for IPv4 or IPv6 fields and a portion for IPv4 or IPv6 addresses. The packet also includes a version, a Type, a virtual router ID, a priority, a count or number of addresses in the advertisement, a maximum advertisement interval or time between advertisements, and a checksum. The Type field indicates that the packet is an advertisement from a master router.

Routers also send alarms to the centralized management system to notify the centralized management system of any anomaly or change in the network conditions. Alarms are set with a "set alarm" message and when network conditions change, the alarms are cleared with a "clear alarm" message. In other words, when the network is restored or the issue is fixed, routers send another message called "clear alarm" to clear the previous "set alarm" condition. These set and clear alarm conditions are sent by the same router. In other words, only the router that set an alarm can clear an alarm. The management system uses these messages to identify that there is a network issue, that the network issue is resolved, and that the network system is restored back to a healthy state.

These and other changes are notified to a system administrator by the management system using an in-band or out-of-band communication, such as email, SMS (Short Message System), or application push notifications, among others. On receiving a "clear alarm" message, the management system can mark the state of at least this portion of the network as healthy and notify the administrator of the recovery or correction.

Figure 3:
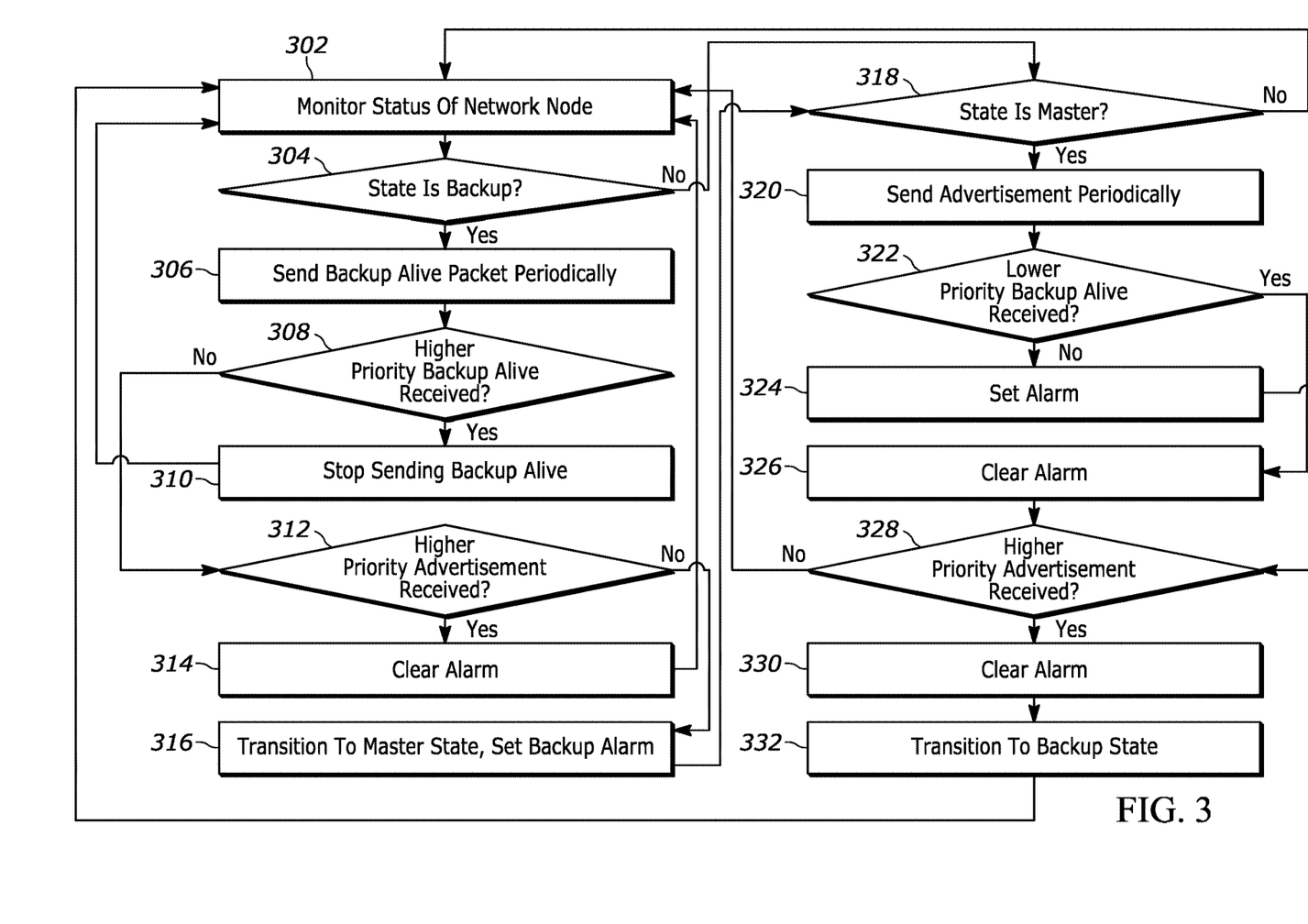
FIG. 3 is a process flow diagram of enhanced messaging to support router redundancy according to embodiments of the present invention.

FIG. 3 is a process flow diagram of operations of a network node that is able to transition between master and backup states. Consider a centralized management system managing thousands of routers including two routers named R1 and R2. R1 and R2 are running VRRP to provide routing redundancy. If either one of the two routers goes down, the other one operates in the master state to provide connectivity to other clients in the network. Either the router in the backup state goes down and the master continues to operate as a master router or the router in the master state goes down and the backup assumes the master state.

Even when one of the routers is down, although the other router is up and providing connectivity, the system has lost a backup and is in an unhealthy state. If the other router fails or loses connectivity, then there is no router available to provide seamless connectivity to clients. While some implementations may have multiple backups, the loss of one backup is a condition which should require some attention. VRRP provides for an alarm to indicate that no backup router is available. Another router is able to set and clear the alarm if a router fails, shuts down, or loses connectivity and comes back online.

As an example, consider a first scenario in which R1 is in the master state. In VRRP this occurs when R1 is provisioned with a higher relative router priority than any neighbor routers, including in this example R2. R2 is provisioned with a lower relative router priority than R1 and so is in the backup state. When R1 fails or when the connection to R1 fails, router R2 will transition from the backup to the master state. This transition also triggers R2 to set and send an alarm informing the central management system that the backup is down and in the event of its failure there is no further backup to take its place leaving the overall system in an unhealthy state. The alarm is sent to all nodes within reach and becomes available to the central management system too. The central management system may notify an administrator, depending on the network configuration.

This is shown in FIG. 3 as a router e.g., R2 in this example monitors its status at 302. R2 is in a backup state so at 304 the decision is to send a backup alive packet periodically at 306. At 312 R2 determines that no higher priority advertisement packet is being received. This corresponds to a failure in the connection with R1, the associated master router. With no advertisement packet received after a particular time interval, then at 316, R2 transitions to a master state and sets an alarm indicating that there is no backup. If higher priority advertisement packets are being received at 312, then any alarm is cleared at 314, the clear alarm is sent to the managements system, and R2 continues in the backup state. After the state transition to the master state at 316, R2 in response to being in the master state at 318 will send periodic advertisement packets 320. R2 in the master state determined at 318 will also monitor the network for lower priority backup alive packets at 322. If it receives one, then any alarm is cleared at 326. R2 as a master router also monitors for higher priority advertisement packets at 328. If no backup alive packet is received at 322, then R2 sets an alarm at 324 that no backup is available and monitors for higher priority advertisement packets at 328.

At a later time R1 may come back online through a repair, reboot, or correction of the connectivity failure. In VRRP, R1 may be provisioned to come back online in either pre-empt or non-preempt mode. After rebooting it will transition from an initial state to a backup state.

If R1 is operating in pre-empt mode, then it will receive a VRRP advertisement packet from R2, at 320, which is operating in the master state determined at 318. The packet includes the priority that was provisioned to R2. R1 compares the router priority of R2 to its own higher router priority and then pre-empts the master state of R2. R1 transitions to the master state and sends its own higher priority advertisement packet. On receiving the higher priority advertisement packet at 328, R2 will send a clear alarm message to the central management system at 330 and transition to the backup state at 332. The alarm is cleared by R2 because R2 becomes the backup.

If R1 is operating in non-preempt mode, then there is a different sequence of operations. As in the pre-empt role, in the non-preempt role, R1 will receive a lower priority advertisement packet from R2 which is operating in the master state. By contrast, R1 will not pre-empt R2 and transition to the master state but will continue in the backup state. R2 will continue to send lower priority advertisement packets at 320 and will be unaware of R1 being active and connected to the network.

When R1 failed, R2 set an alarm at 316 due to not receiving an advertisement packet from R1 at 312. Only R2 has a context to clear the alarm that R2 set at 316. However, if R1 does not send an advertisement packet or a backup alive packet, then R2 is unaware of R1 being back online and will not know to clear the alarm. For the same reasons, the central management system does not know that R1 is operational, and that the system has become healthy again. The same applies to the administrator. Without a backup alive packet, the status of R1 is discovered through an indirect mechanism, such as pinging or traffic monitoring, R2 is notified, and then R2 clears the alarm. This indirect mechanism may be slow or unreliable.

In embodiments described herein, R1 in the backup state can send a backup alive packet to neighboring nodes and the central management system. Upon receiving this packet at 322 R2 is notified that R1 is online and operating in the backup state. R2 may then send a clear alarm message at 326. This message will notify the central management system that R1 is back online and that there is a backup router available for the master router R2. The central management system can in turn mark the system state to be healthy and notify the administrator. The backup alive packet may be sent periodically, or at intervals, by the backup router R1 so that it will be received reliably by other routers. The interval may be provided in the maximum advertisement interval field of the packet. In addition to using the backup alive packet to clear the alarm, R2 may also use any received backup alive packet to determine the availability of any other backup routers at 322.

In some embodiments, the overhead traffic load on the network may be reduced by restricting use of a backup alive packet. Each router in VRRP is provisioned with a relative router priority for the network that is included in master router advertisement packets. To reduce network load, the backup alive packet may be restricted to routers having the next higher priority after the nearest master router. A backup router may evaluate a received backup alive packet at 308 and then not transmit a backup alive packet at 310 if the backup router is already receiving a higher priority backup alive packet.

The backup alive packet may take many different forms. In some embodiments, the backup alive packet may be similar to the advertisement packet. The advertisement packet is shown in FIG. 2. RFC 5798 defines a 4-bit Type field in the VRRP Packet Format. A Type field value 0x1 is designated for "Advertisement" as defined in Section-5.2.2. This is the message that is periodically sent by each master router. A backup alive packet may make use of a different value in, for example, the Type field. In some embodiments a Type field value 0x2 may be designated for "Backup_Alive," however, any other value may be used to suit any particular implementation.

The backup alive packet may be further configured using no virtual MAC address and using the backup router's own source address as the physical MAC address of the interface, which is running VRRP. Withholding the virtual MAC (Media Access Control) address prevents intermediate switches that receive the packet from updating their ARP (Address Resolution Protocol) tables to map the virtual MAC address to the backup router's IP (Internet Protocol) address.

Figure 4:
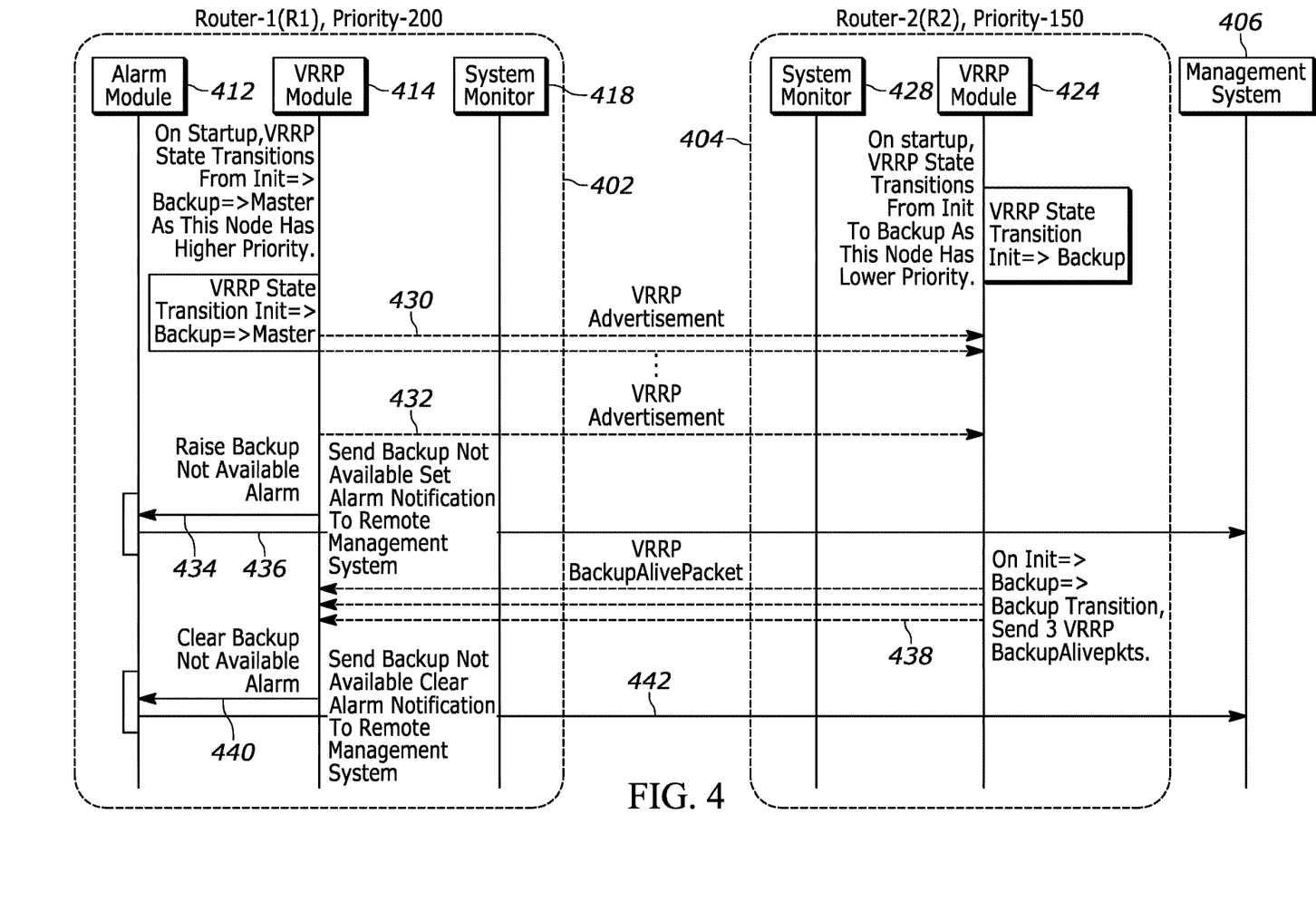
FIG. 4 is a sequence diagram of two nodes performing enhanced messaging during a startup event according to embodiments of the invention.

FIG. 4 is a sequence diagram of two network nodes performing a startup in response to network initialization or another startup event. The sequence diagram shows an example of the operations described above in a particular example. These operations include monitoring network interfaces and remote hosts, changing states and setting and clearing alarms in response to advertisement and backup alive packets. FIG. 4 has a first router 402, indicated by R1, that becomes a master node, a second router 404, indicated by R2, that becomes a backup node, and a centralized management system 406, all connected through a network, for example the network of FIG. 1 or any other suitable data communications network. The first router 402 is indicated as having a router priority of 200 which is higher relative to the router priority of the second router 404 of 150. Accordingly, the first router 402 is in the master state and the second router 404 is in a backup state relative to the first router 402. The first router 402 includes an alarm module 412, a VRRP module 414, and a system monitor 418. Similarly, the second router 404 includes a VRRP module 424 and a system monitor 428. Both routers may include other modules which are not shown in order to not obscure the drawing. The modules may have dedicated physical hardware resources, dedicated virtual resources, or may exist as portions of larger systems. The sequence diagram shows only certain example signals to illustrate particular parts of the system operation. Many more signals may be sent and received before, during and after the signals described herein.

In summary of FIGS. 4, R1 and R2 are configured with VRRP to provide redundant routing paths via automatic default gateway selection. As shown, R1 has a higher relative router priority than R2 so that, during any startup with R2, it will transition to the master state with reference to R2. R1 will raise the backup not available alarm and start sending advertisement packets. The centralized management system will mark the overall system as unhealthy on receiving the backup not available alarm. On the other hand, R2 will transition from an initial state to a backup state, after which it will send backup alive packets to R1. On receiving these packets, R1 will clear the previously raised backup not available alarm. The centralized management system will receive the cleared alarm, and then mark the overall system as healthy. An alarm system at the centralized management system is able to log the many alarms that are set and cleared for a maintenance console and to evaluate the overall health of the system centrally.

Considered in more detail, the first router 402 and the second router 404 experience a startup event and both routers start into an initial (Init) state and then transition from this initial state to a backup state. the first router 402, finding no higher priority router, then transitions to a master state. The first router 402 sends VRRP advertisement packets 430 from its VRRP module 414 to all of the neighboring nodes. These nodes include the second router 404. the first router 402 sends additional advertisement packets 432 from its VRRP module 414 periodically to all the nodes. When the first router 402 does not receive any communication from any backup node the VRRP module 414 raises a backup not available alarm 434 to the first router alarm module 412. The alarm module 412 sets the alarm and sends an alarm message 436 to the centralized management system 406.

At the second router 404 the router starts up into an initial state and then transitions to a backup state because this node has a lower router priority relative to the first router 402. In the backup state, the second router VRRP module 424 receives the VRRP advertisement packets 430 from the VRRP module 414 of the second router 404. It also receives all the repetitions of the additional advertisement packets 432 as well. Once the second router 404 has reached the backup state, its VRRP module 424 sends a VRRP backup alive packet 438 to the VRRP module 414 of the first router 402. In this example the second router 404 sends the VRRP backup alive packet 438 three times to ensure receipt by the connected routers. When the first router 402 receives the VRRP backup alive packets 438 at its own VRRP module 414, the VRRP module 414 raises a clear backup not available alarm message 440 to the alarm module 412. The alarm module 412 then sends a clear alarm 442 to the centralized management system 406. As a result, both routers 402, 404 are initialized and active as master or backup. The management system has received information from these routers that the system is healthy.

Figure 5:
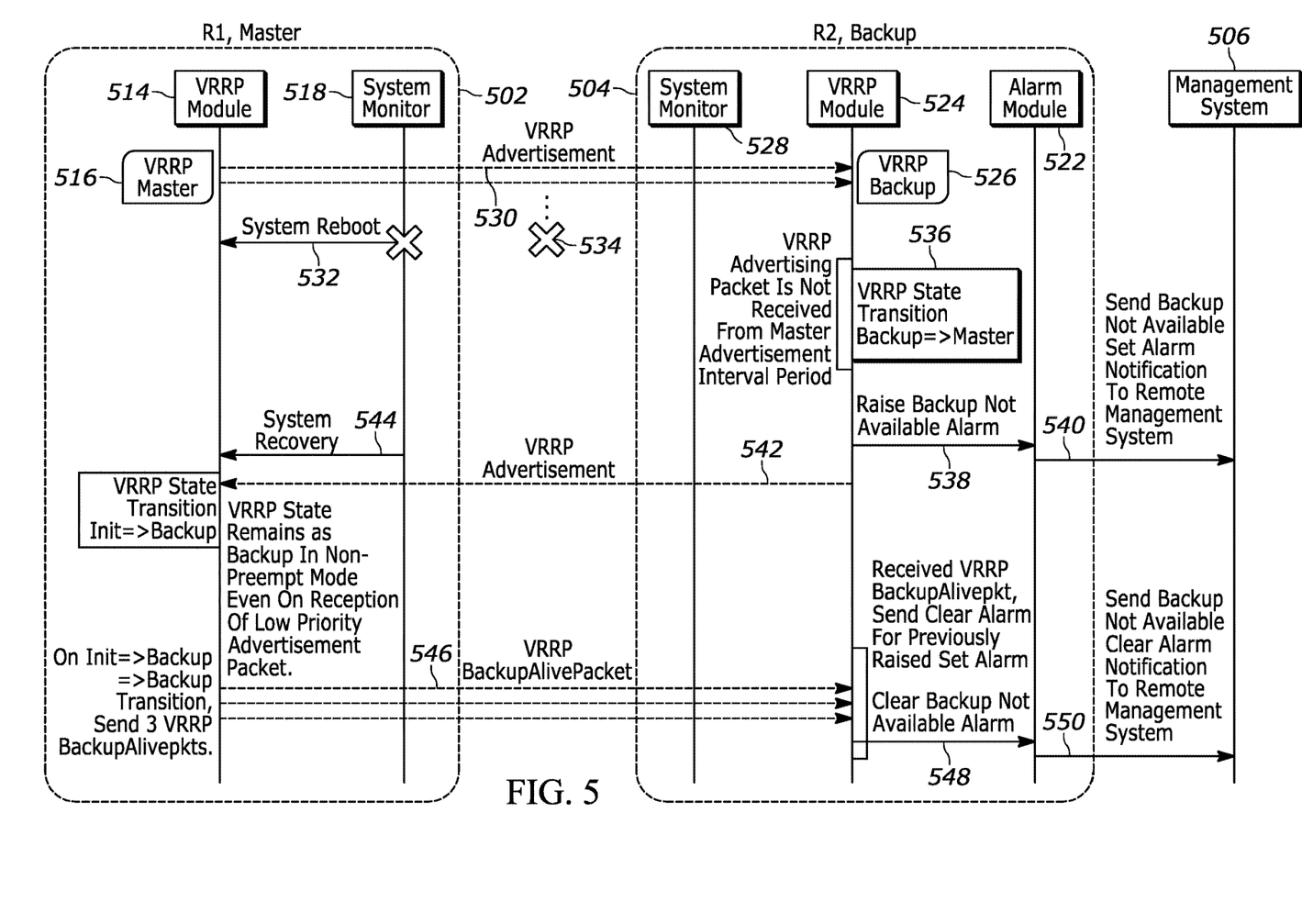
FIG. 5 is a sequence diagram of two nodes performing enhanced messaging when the master node reboots and recovers into a non-preempt mode according to embodiments of the invention.

FIG. 5 is a sequence diagram of two network nodes in which the master node performs a reboot and recovery into the backup state in a non-preempt mode. The sequence diagram shows an example of some of the operations of FIG. 3 in a particular example. FIG. 5 has a first router 502, designated as R1, a second router 504, designated as R2, and a management system 506 all connected through a network, for example the network of FIG. 1 or any other suitable data communications network. The first router 502 includes a VRRP module 514, and a system monitor 518, among other components. Similarly, the second router 504 includes an alarm module 522, a VRRP module 524, and a system monitor 528. The modules may have dedicated physical hardware resources, dedicated virtual resources, or may exist as portions of larger systems. The sequence diagram shows only certain example signals to illustrate particular parts of the system operation. Many more signals may be sent and received before, during, and after the signals described herein.

In summary of FIG. 5, R1 performs a system reboot. R2 stops receiving VRRP advertisement packets from R1 while R1 is rebooting. After a master down timer expires, R2 raises a VRRP backup not available alarm and it transitions state to become the master router in the place of R1. When R1 is recovered, its VRRP state moves from initial to backup and remains as the backup in non-preempt mode irrespective of having higher priority. Upon reaching the backup state R1 sends three VRRP backup alive packets to R2. On receiving these packets, R2 will clear the previously raised backup not available alarm.

Considered in more detail, the first router 502 is in a VRRP master state 516 and sends VRRP advertisement packets 530 from its VRRP module 514. The advertisement packets are received at the second router 504 at its VRRP module 524. the second router 504 is in a VRRP backup state 526. Later, the system monitor 518 of the first router 502 initiates a system reboot 532. This causes the connection 534 between the first router 502 and the second router 504 to be lost. At the second router 504, the VRRP advertisement packets are no longer received because the first router 502 is performing the system reboot 532. After not having received an advertisement packet for a predetermined time interval for advertisement packets, the second router 504 transitions from its backup state to a master state 536 to take the place of the unresponsive master router the first router 502. the second router 504 also raises a backup not available alarm 538 from its VRRP module 524 to its alarm module 522. The alarm module 522 sends a backup not available alarm 540 to the management system 506.

After the incident of the system reboot 532 the first router 502 fully recovers and so the system monitor 518 sends a notice 544 of this recovery to the VRRP module 514. the first router 502 then transitions from its initial state to a backup state. In this example, the first router 502 is in a non-preempt mode. Even when receiving lower priority VRRP advertisement packets the first router 502 does not transition from its backup state to a master state. As shown, the first router 502 receives VRRP advertisement packets 542 from the second router 504 at its own VRRP module 514. Rather than transition to the master state in non-preempt mode, the first router 502 then sends VRRP backup alive packets 546 from its VRRP module 524 to the second router 504. The VRRP backup alive packets 546 are received at the VRRP module 524 of the second router 504. In response to receiving the backup alive packets, the VRRP module 524 raises a clear alarm signal 548 to the alarm module 522. The alarm module 522 sends a clear alarm 550 from the second router 504 to the management system 506.

Figure 6:
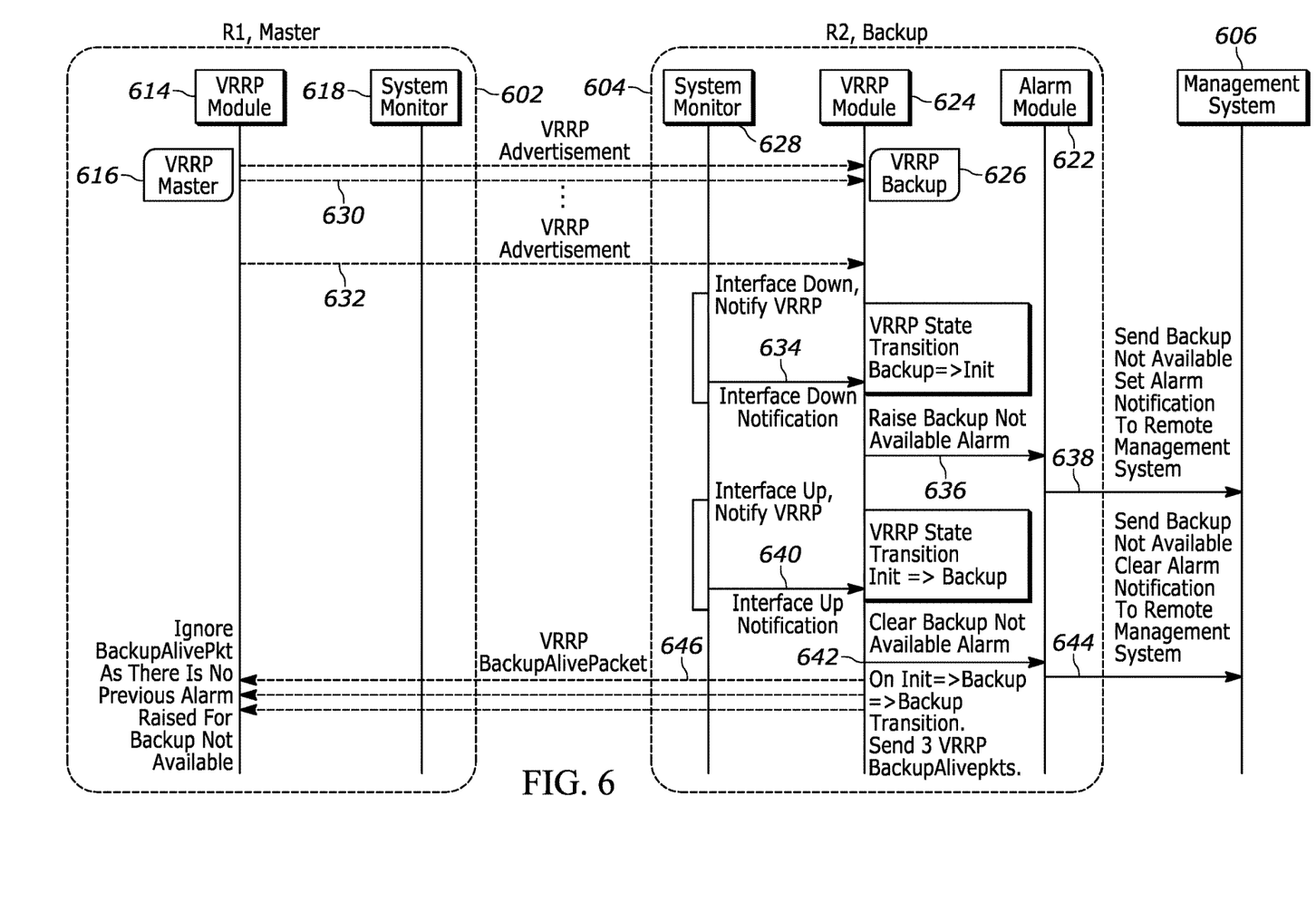
FIG. 6 is a sequence diagram of two nodes performing enhanced messaging when the backup node network interface fails and recovers according to embodiments of the invention.

FIG. 6 is a sequence diagram of two network nodes in which the backup node experiences an interface failure and recovery. The sequence diagram shows an example of some of the operations of FIG. 3 in a particular example. FIG. 6 has a first router 602, designated as R1, a second router 604, designated as R2, and a management system 606 all connected through a network, for example the network of FIG. 1 or any other suitable data communications network. The first router 602 includes a VRRP module 614 and a system monitor 618, among other components. Similarly, the second router 604 includes an alarm module 622, a VRRP module 624, and a system monitor 628. The modules may have dedicated physical hardware resources, dedicated virtual resources, or may exist as portions of larger systems. The sequence diagram shows only certain example signals to illustrate particular parts of the system operation. Many more signals may be sent and received before during and after the signals described herein.

In summary of FIG. 6, R2 undergoes network interface failure where its operator status is "down." Once R2 receives this interface down notification, it raises a backup not available alarm and R2 transitions from the backup state to the initialization state. After some time, when the network interface has been recovered and is up, R2 transitions from the initial state back to the backup state. During this transition, the backup not available alarm is cleared by R2 and VRRP backup alive packets are sent to R1. These backup alive packets are not used by R1 to generate an alarm as there is no previous backup not available alarm on R1.

Considered in more detail, the first router 602 is in a VRRP master state 616 and sends advertisement packets 630 from its VRRP module 614. The advertisement packets are received at the second router 604 at its VRRP module 624. the second router 604 is in a VRRP backup state 626. The transmission of advertisement packets 632 is repeated at regular intervals. Later, the system monitor 628 of the second router 604 observes that an interface is down, in particular the interface to the first router 602. The system monitor 628 sends an interface down notice 634 to the VRRP module 624. The VRRP module responds by transitioning from the backup state to an initial state since it is no longer able to be a backup to the first router 602. The VRRP module 624 also raises an alarm 636 to the alarm module 622 which in turn sends a backup not available alarm 638 the management system. While the VRRP module 614 of the first router 602 is still operating as a master and may still send advertisement packets 630, 632, these are not received at the second router 604 because of the failed interface.

At a later time, the network interface at the second router 604 is recovered and the system monitor 628 sends an interface up notice 640 to the VRRP module 624. After receiving the interface up notice 640, the VRRP module 624 transitions the second router 604 from its initial state to the backup state. It also notifies the alarm module 622 to clear the alarm. The alarm module 622 sends clear backup not available alarm 633 to the management system 606. After being recovered to the backup state, the VRRP module 624 also sends one or more backup alive packets 646 to any connected nodes and especially to the first router 602. The first router 602 may respond to the backup alive packets 646 with a clear alarm message to the management system, but in this case, the first router 602 did not set an alarm so it will not clear the alarm. If the interface recovers quickly, then down interface may not affect traffic carried by the master. The management system 606 may log failures of various interfaces by the setting and clearing of alarms to determine which systems may require maintenance.

Figure 7:
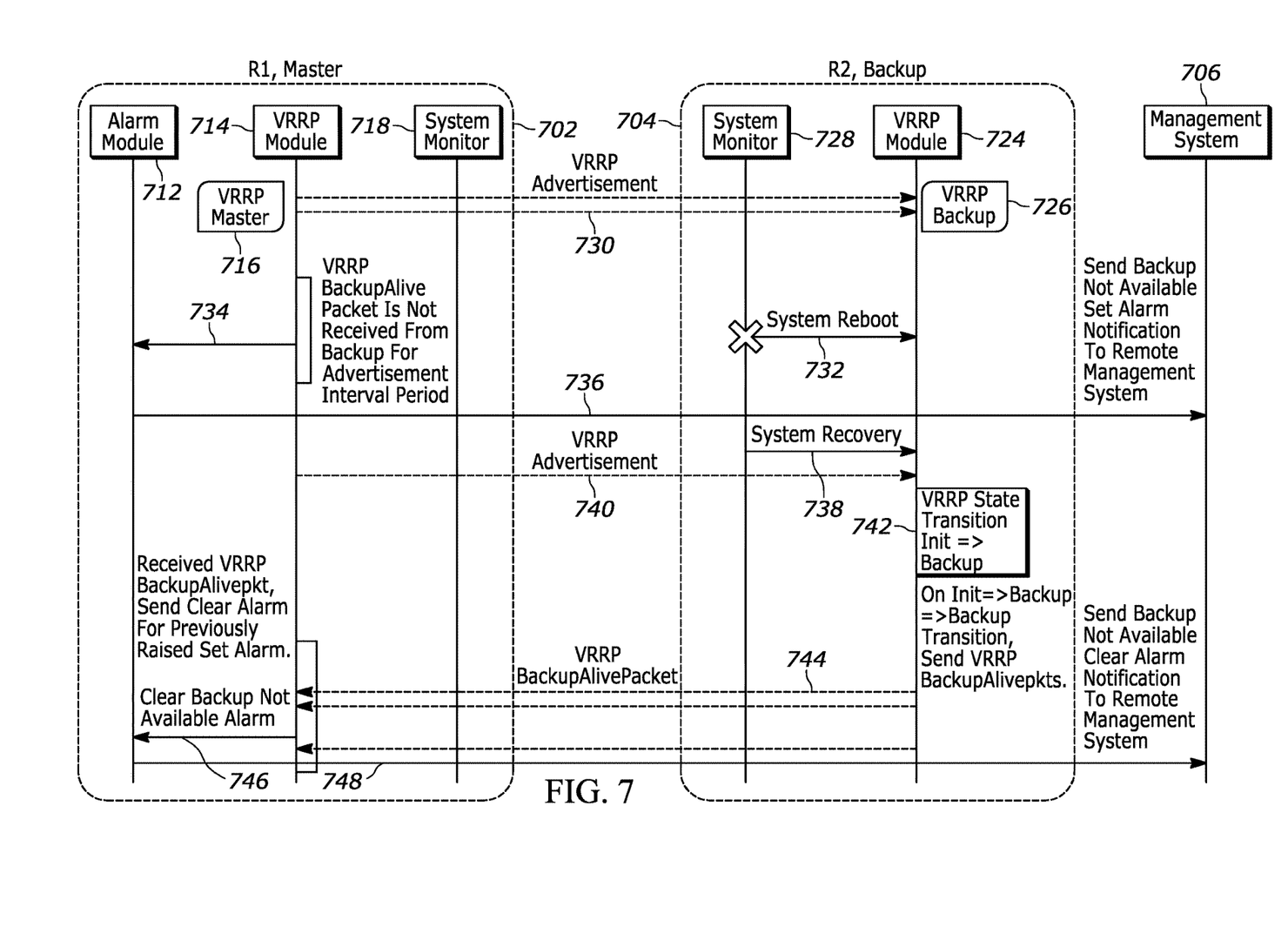
FIG. 7 is a sequence diagram of two nodes performing enhanced messaging when the backup node reboots and recovers according to embodiments of the invention.

FIG. 7 is a sequence diagram of two network nodes in which the backup node performs a reboot and recovery into the backup state in a non-preempt mode. The sequence diagram shows an example of some of the operations of FIG. 3 in a particular example. FIG. 7 has a first router 702, indicated as R1, a second router 704, indicated as R2, and a management system 706 all connected through a network, for example the network of FIG. 1 or any other suitable data communications network. The first router 702 includes an alarm module 712, a VRRP module 714, and a system monitor 718, among other components. Similarly, the second router 704 includes a VRRP module 724, and a system monitor 728. The modules may have dedicated physical hardware resources, dedicated virtual resources, or may exist as portions of larger systems. The sequence diagram shows only certain example signals to illustrate particular parts of the system operation. Many more signals may be sent and received before, during, and after the signals described herein.

In summary of FIG. 7, R1 in the master state sends periodic advertisement packets and R2 in the backup state sends periodic backup alive packets. At some point in time, R2 undergoes system failure and stops sending backup alive packets to R1. R1 raises a backup not available alarm after no backup alive packet has been received for a predetermined interval period for backup alive packets. Later, when R2 is recovered and transitions to the backup state, R2 starts sending backup alive packets again. On receiving backup alive packets from R2, R1 clears the backup not available alarm.

Considered in more detail, the first router 702 is in a VRRP master state 716 and sends VRRP advertisement packets 730 from its VRRP module 714. The advertisement packets are received at the second router 704 at its VRRP module 724. the second router 704 is in a VRRP backup state 726. Later, the system monitor 728 of the second router 704 initiates a system reboot 732. This causes the connection between the first router 702 and the second router 704 to be lost. At the first router 702 the backup alive packets are no longer received because the second router 704 is performing the system reboot 732 and cannot send them. After not having received a backup alive packet for a predetermined time interval for backup alive packets, the first router 702 raises a backup not available alarm 734 from its VRRP module 714 to its alarm module 712. The alarm module 712 sends a backup not available alarm 736 to the management system 706.

After the incident of the system reboot 732 the second router 704 fully recovers and so the system monitor 728 sends a notice 738 of this recovery to the VRRP module 724. the second router 704 then performs a state transition 742 from its initial state to a backup state. the second router 704 receives higher priority advertisement packets 740 from the first router 702 and therefore does not transition from its backup state to a master state. the second router 704 after the recovery and state transition 742 to the backup state sends backup alive packets 744 from its VRRP module 724 to the first router 702. The backup alive packets 744 are received at the VRRP module 714 of the first router 702. In response to receiving the backup alive packets, the VRRP module 714 raises a clear alarm signal 746 to the alarm module 712. The alarm module 712 sends a clear alarm 748 from the first router 702 to the management system 706.

Figure 8:
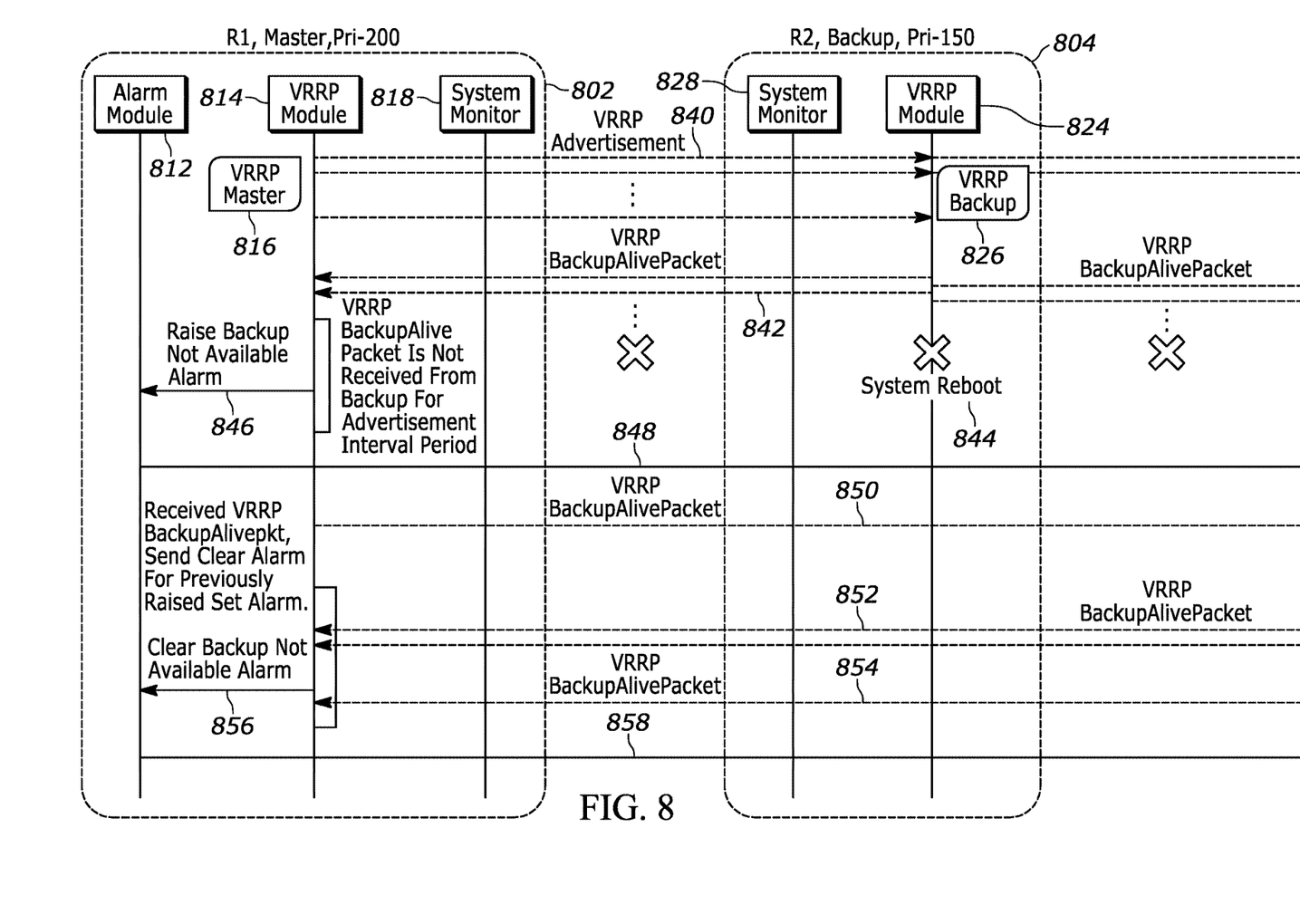
FIG. 8 is a sequence diagram of multiple nodes performing enhanced messaging when the primary backup nodes reboots and recovers according to embodiments of the invention.

FIG. 8 is a sequence diagram of three network nodes, a master and two backup nodes, in which the primary backup node performs a reboot. The sequence diagram shows an example of some of the operations of FIG. 3 in a particular example. FIG. 8 has a first router 802, indicated as R1, a second router 804, indicated as R2, a third router 808, indicated as R3, and a management system 806 all connected through a network, for example the network of FIG. 1 or any other suitable data communications network. The relative priorities under VRRP are indicated in the figure in that R1 has a router priority of 200, R2 has a router priority of 150 and R3 has a router priority of 100. If all three routers are operating, then R1 with the highest relative router priority of 200 operates in the master state, as shown. If R1 were to fail, then R2 would transition to the master state instead of R3 because R2 has a higher relative router priority.

These router priorities are provisioned in the VRRP configuration to provide orderly network administration. The router priorities are included in VRRP packets so that each node that receives a VRRP packet can determine whether it has a higher or lower router priority relative to the other nodes and assume appropriate states during initialization and in response to events on the network. While three-digit numbers are shown as the provisioned router priority, relative router priority may be shown using any other suitable indicator.

The first router 802 includes an alarm module 812, a VRRP module 814, and a system monitor 818, among other components. Similarly, the second router 804 includes a VRRP module 824, and a system monitor 828. The third router includes a VRRP module 834, and a system monitor 838, among other components. The modules may have dedicated physical hardware resources, dedicated virtual resources, or may exist as portions of larger systems. The sequence diagram shows only certain example signals to illustrate particular parts of the system operation. Many more signals may be sent and received before, during, and after the signals described herein.

In summary of FIG. 8, R2, the highest priority backup node, sends backup alive packets to all the nodes participating in VRRP. R3 listens to both VRRP advertisements from R1 and VRRP backup alive packets from R2. At some point, R2 undergoes system failure and stops sending VRRP backup alive packets. As a result, neither R1 nor R3 receive any VRRP backup alive packets from R2. After the backup alive packet interval period, R1 raises a VRRP backup not available alarm. R3 starts sending backup alive packets as the next highest priority backup node. On receiving backup alive packets from R3, R1 raises a clear alarm for the backup not available alarm.

Considered in more detail, the first router 802 is in a VRRP master state 816 and sends VRRP advertisement packets 840 from its VRRP module 814. The advertisement packets are received at the second router 804 at its VRRP module 824 and at the third router 808 at its VRRP module 834. the second router 804 and the third router 808 are in a VRRP backup state 826, 836. Later, due to any of a variety of possible causes, the system monitor 828 of the second router 804 initiates a system reboot 844. This causes the connection between the second router 804 and the first router 802 and the third router 808 to be lost. At the first router 802 and the third router the VRRP backup alive packets are not being received because the second router 804 is performing the system reboot 844. After not having received a backup alive packet for a predetermined time interval for backup alive packets, the first router 802 raises a backup not available alarm 846 from its VRRP module 814 to its alarm module 812. The alarm module 812 sends a backup not available alarm 848 to the management system 806. At the same time the first router 802 continues to send advertisement packets 850 which are received in any neighboring nodes including at the VRRP module 834 of the third router 808.

the third router 808, which has maintained its backup state and is the next highest priority backup so, after not receiving a backup alive from the second router 804 for the backup alive interval, it becomes the backup node to the first router 802, which is in the master state. the third router 808 then sends backup alive packets 852 from its VRRP module 834 to the first router 802 and any other neighboring nodes. The backup alive packets 852 are received at the VRRP module 814 of the first router 802. In response to receiving the backup alive packets, the VRRP module 814 raises a clear alarm signal 856 to the alarm module 812. The alarm module 812 sends a clear alarm 858 from the first router 802 to the management system 806. While the primary backup is not alive, the secondary backup is alive and the system health is restored. After the primary backup is restored it will resume sending backup alive packets and the secondary backup will stop sending the backup alive packets. No alarms are required for that sequence of events.

Figure 9:
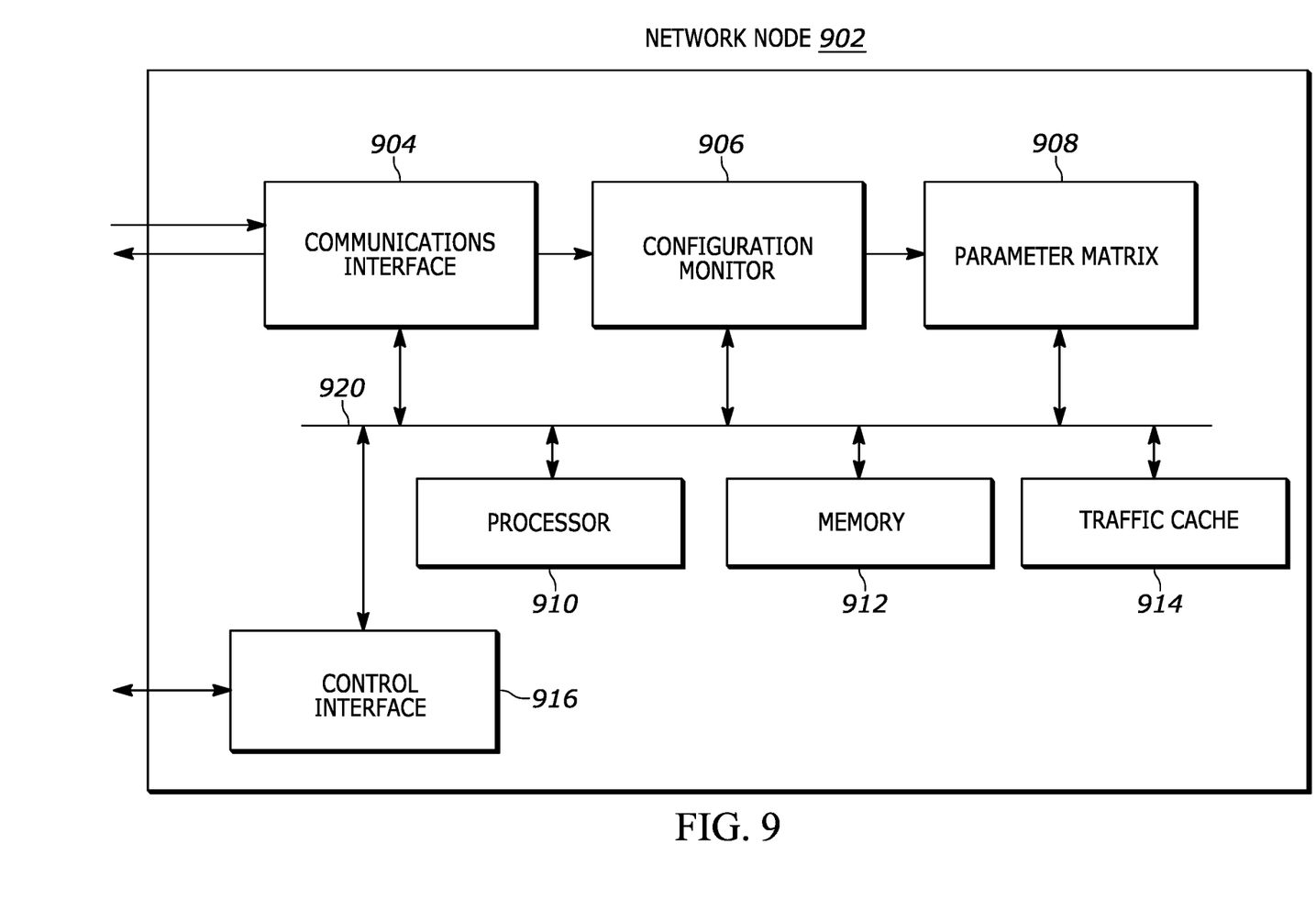
FIG. 9 is a block diagram of a network node according to embodiments of the invention.

FIG. 9 is a block diagram of a network node 902, which may be an active node master or backup node or a remote or peer host, according to an embodiment herein. The node includes a processor 910, memory 912, and a communications interface 904 connected together through a bus 920. The processor 910 may include a multifunction processor and/or an application-specific processor. The memory 912 within the node may include, volatile and non-volatile memory for example, a non-transitory storage medium such as read only memory (ROM), flash memory, RAM, and a large capacity permanent storage device such as a hard disk drive. The communications interface 904 enables data communications with enhanced VRRP and state transitions as described above via local and wide area connections using one or more different protocols including BGP (Border Gateway Protocol) and VRRP. The node executes computer readable instructions stored in the storage medium to implement various tasks as described above. The node 902 further includes a traffic cache module 914 coupled to the bus 920 with various caches (e.g., application cache, domain application cache, client route cache, and application route cache) to store mapping information and other traffic communication data.

The node 902 further includes a configuration monitor 906 to monitor policy input as described above including BGP/OSPF (Open Shortest Path First) updates, VRRP state updates, network interface state updates, and remote monitor updates, among others. The configuration monitor 906 generates alerts or interrupts and updates backup status 908 when there are changes to any of the monitored network node state and configurations. The processor 910 may alternatively be configured to update the backup status as well as apply policies to the updates, compare priorities, and transition state, and set and clear alarms, among other tasks.

A control interface 916 may be provided for node management and configuration purposes as an interface to a computer monitor or flat panel display but may include any output device. In addition, the control interface 916 may include an interface to a computer keyboard and/or pointing device such as a computer mouse, computer track pad, touch screen, or the like, that allows a user to provide inputs and receive outputs including a GUI (graphical user interface). A GUI can be responsive of user inputs and typically displays images and data. The control interface 916 can be provided as a web page served via a communication to a remote device for display to a user and for receiving inputs from the user. Additionally, each of the modules may be implemented through computer-readable instructions that are executed on a physical processor of a computing system that supports the node The embodiments disclosed herein can be implemented through at least one software program running on at least one hardware device and performing network management functions to control the network elements. The network elements shown in FIG. 1 include blocks which can be at least one of a hardware device, or a combination of hardware device and software module. It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

In an embodiment, the functionality described above is performed by a computer device that executes computer readable instructions (software). Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
monitoring a status of a network node at the network node, the network node being coupled to a network;
determining that the network node is operating in a backup state; and
sending a backup alive packet through the network in response to determining that the network node is operating in the backup state;
further comprising:
monitoring VRRP advertisement packets of other network nodes of the network;
determining a relative router priority of the network node; and
sending the backup alive packet where there is no other backup network node having a higher router priority than the network node.

2. The method of claim 1, wherein the backup state is a VRRP (Virtual Router Redundancy Protocol) backup state and wherein sending the backup alive packet comprises sending a backup alive message in a VRRP packet format.

3. The method of claim 2, wherein the backup alive packet is contained in a Type field of the VRRP packet format.

4. The method of claim 1, wherein determining that the network node is operating in the backup state comprises determining that the network node is transitioning to the backup state from a different state.

5. The method of claim 1, wherein sending the backup alive packet comprises sending multiple consecutive backup alive packets.

6. The method of claim 1, further comprising repeating sending the backup alive packet at a predetermined time interval.

7. The method of claim 1, further comprising:
monitoring VRRP advertisement packets of other network nodes of the network;
transitioning to a master state if no master VRRP advertisement packet is received having a higher router priority than the network node; and
ceasing sending the backup alive packet.

8. The method of claim 7, further comprising:
monitoring VRRP advertisement packets of other network nodes of the network;
transitioning to the backup state when a master VRRP advertisement packet is received having a higher router priority than the network node; and
sending the backup alive packet.

9. The method of claim 7, further comprising sending a VRRP advertisement packet after transitioning to the master state.

10. The method of claim 1, further comprising:
monitoring VRRP backup alive packets of other nodes of the network; and
ceasing sending the backup alive packet upon receiving a VRRP backup alive packet having a higher router priority than the network node.

11. A network node comprising:
a processor and memory that stores computer readable instructions, which when executed by the processor, implement;
a system monitor configured to monitor a status of the network node and to determine that the network node is operating in a VRRP (Virtual Router Redundancy Protocol) backup state; and
a VRRP (Virtual Router Redundancy Protocol) module configured to send a backup alive packet in a VRRP packet format through the network in response to determining that the network node is operating in the VRRP backup state;
the VRRP module being further configured to:
monitor VRRP advertisement packets of other network nodes of the network;
determine a relative router priority of the network node; and
send the backup alive packet where there is no other backup network node having a higher router priority than the network node.

12. The network node of claim 11, the VRRP module being further configured to:
monitor VRRP advertisement packets of other network nodes of the network;
transition to a VRRP master state if no master VRRP advertisement packet is received having a higher router priority than the network node; and
cease sending the backup alive packet.

13. A method comprising:
monitoring backup alive packets of other network nodes at a first network node of a network, wherein the first network node is operating in a master state; and
sending a backup not available set alarm message from the first network node to a management system for the network in response to not receiving a backup alive packet.

14. The method of claim 13, further comprising:
receiving a backup alive packet at the first network node from a second network node through the network; and
sending a backup not available clear alarm message to the management system in response to receiving the backup alive packet.

15. The method of claim 13, further comprising:
monitoring advertisement packets of other network nodes at the first network node of a network before the operation of operating in the master state, wherein the first network node is operating in a backup state; and
transitioning from the backup state to the master state in response to not receiving a higher router priority VRRP master advertisement packet before the operation of monitoring backup alive packets of other network nodes.

16. The method of claim 14, further comprising receiving a VRRP master advertisement packet from a third network node having a higher router priority than the first network node;
transitioning at the first network node from the master state to a backup state in response to receiving the higher router priority VRRP master advertisement packet; and
sending a backup not available clear alarm message to the management system in response to transitioning to the backup state.

17. The method of claim 13, wherein the backup state is a VRRP (Virtual Router Redundancy Protocol) backup state and wherein receiving the backup alive packet comprises receiving the backup alive packet in a VRRP packet format.

18. The method of claim 17, wherein the backup alive packet contains backup alive information in a Type field of the VRRP packet format.

19. A method comprising:
monitoring a status of a network node at the network node, the network node being coupled to a network;
determining that the network node is operating in a backup state; and
sending a backup alive packet through the network in response to determining that the network node is operating in the backup state;
further comprising:
monitoring VRRP backup alive packets of other nodes of the network; and
ceasing sending the backup alive packet upon receiving a VRRP backup alive packet having a higher router priority than the network node.

* * * * *